United States Patent Office 2,869,993
Patented Jan. 20, 1959

2,869,993

ANTIKNOCK MIXTURES

Raymond G. Lyben, Detroit, Mich., assignor to Ethyl Corporation, New York, N. Y., a corporation of Delaware No Drawing. Application May 31, 1955
Serial No. 512,288

7 Claims. (Cl. 44—69)

This invention relates to improved antiknock compositions. These compositions encompass antiknock fluids and leaded fuels. In particular, this invention relates to a class of halo-hydrocarbons having a particular molecular structure for use as a scavenger with lead antiknock compounds.

With the discovery of the antiknock effectiveness of organolead compounds, in particular alkyllead compounds such as tetraethyllead, it was found that for efficient operation of the engine means must be provided to remove the lead-containing products of combustion. The first advance in this art was the discovery that organic halogen compounds, in particular organic chlorides and bromides, when co-present with the lead antiknock compound, reacted in the combustion chamber with the combustion products of the lead antiknock to form volatile lead halides. These lead halides during the exhaust cycle were more or less efficiently removed from the combustion chamber. This process has been called scavenging, and a material capable of so reacting with lead is referred to as a lead scavenger or, more simply, as a scavenger. Choice of a commercial scavenger to date has been based on commercial availability and cost. Thus, up to the present the only scavengers which have enjoyed any commercial success have been ethylene dibromide and ethylene dichloride. Other halogen-containing compounds proposed as scavengers are those which can be introduced into the combustion chambers of the various cylinders of a multi-cylinder engine in the same proportionate ratio as the tetraethyllead. This can be achieved by employing scavengers which have approximately the same relative volatility in the fuel as the tetraethyllead. These scavengers are known as uniformly volatile scavengers. As before, no consideration was given to chemical or physico-chemical properties as they affect the scavenging function.

It is therefore an object of this invention to provide antiknock compositions having improved scavenging properties. It is also an object of this invention to provide antiknock fluids containing improved scavengers. It is likewise an object of this invention to provide fuels containing lead antiknock agents and improved scavengers. It is a further object of this invention to provide means for operating an internal combustion engine with leaded fuels in a manner wherein the advantages of the lead antiknock are utilized to a maximum degree and the disadvantages are minimized. These and other objects of this invention will become apparent from the following description.

The above and other objects of this invention are accomplished by employing as a scavenging agent halohydrocarbon compounds in which the halogen has an atomic weight of 35–81 and is attached to a saturated carbon atom which is alpha to a doubly bonded nuclear carbon atom and in which there is a hydrogen atom on a carbon atom alpha to the halogen-bearing carbon. That is, the halogen-bearing carbon atom of the scavenger compounds of this invention is attached by single bonds to a nuclear carbon atom and to a non-aromatic hydrogen-bearing carbon atom. There can be more than one halogen in the molecule, provided that each halogen is on a carbon atom which is alpha to a nuclear carbon and also alpha to a hydrogen-bearing carbon, said compound being further characterized in that there is a separate or different hydrogen-bearing carbon atom in a position alpha to each halogen-bearing carbon. For brevity, the scavenger compounds of this invention are hereinafter referred to as alkyl-aryl-halomethane compounds. The novel scavenging agents of this invention are chlorohydrocarbons, bromohydrocarbons, and chlorobromohydrocarbons. The aryl and non-aryl portions of the molecule may have other hydrocarbon substituents thereon. The smallest hydrocarbon radical which can provide a scavenger of this invention contains eight carbon atoms. The compound in question is 1-halo-1-phenylethane. In order to provide scavengers having suitable inductibility characteristics with respect to introduction into the combustion chamber of a spark-ignition engine through the fuel lines of conventional commercial engines, I prefer to employ scavengers having up to 20 carbon atoms. Thus, the carbon content of my scavengers ranges from 8 to 20 carbon atoms per molecule.

In general my invention comprises providing halohydrocarbon scavenger-containing lead antiknock fluids and fuels wherein at least 1 mole percent of halogen in the halohydrocarbon scavenger is present in the form of halohydrocarbons having from 8 to 20 carbon atoms and 1 to 4 halogens, in which each halogen has an atomic weight of 35–81 and is attached to a saturated carbon atom which is alpha to a doubly bonded nuclear carbon atom and in which there is a separate hydrogen-bearing carbon alpha to each halogen-bearing carbon atom.

A preferred embodiment of my invention comprises providing halohydrocarbon scavenger-containing lead antiknock fluids and fuels wherein at least 1 mole percent of halogen in the halohydrocarbon scavenger is present in the form of halohydrocarbons having 8 to 14 carbon atoms and 1 to 4 halogens, in which the halogen has an atomic weight of 35–81 and is bonded to a non-aromatic carbon atom which is alpha to a doubly bonded nuclear carbon and is also alpha to hydrogen-bearing carbon atom, said compound being further characterized in that there is a separate alpha hydrogen-bearing carbon atom for each halogen. The reason for this preferred class is that it is found that compounds having 8–14 carbon atoms possess the most desirable evaporation characteristics in fuel such as to give a suitable pattern of distribution among all the cylinders of a multi-cylinder engine under the intake manifold conditions encountered in vehicles in service.

With all halogen scavengers, the scavenging effect is achieved by decomposition of the scavenger in the engine to form hydrogen halide, which then reacts at some point in the combustion cycle with the decomposition product of the lead antiknock compound to form volatile lead halide. Previously known scavengers produce such hydrogen halide only during or after the advance of the flame front. The scavengers of this invention achieve their enhanced effectiveness because they produce the hydrogen halide not only during and after the advance of the flame front but, more significantly, before the passing of the flame front. It has been established that lead antiknock compounds exert their effectiveness by the production in the combustion chamber of a fog of non-halogenated inorganic lead which is probably lead oxide. This lead oxide fog not only is produced before the advance of the flame front but also exerts its influence on knock-inducing components of the combustion chamber gases prior to their combustion in the flame front. The duration of the effectiveness of these antiknock particles is short because they agglomerate rapidly and the amount of surface exposed to the reactive fuel-air mixture drops off. For best results the active scavenging chemical, hydrogen halide, should be available shortly after the lead oxide particles have exerted their antiknock effect but before they have agglomerated into large particles or deposited on the walls of the combustion chamber. In order to accomplish this, the scavengers must have a rate of decomposition which is closely related to the decomposition rate of tetraethyllead. Thus, there is a supply of hydrogen halide available for reaction with the lead antiknock decomposition products shortly after they have performed their function as antiknocks. Hence, there is more time for reaction between hydrogen halides and the lead antiknock decomposition products under conditions most favorable to such reaction, namely, in the presence of large amounts of oxygen before a given part of the mixture is consumed by the combustion flame. Because the compounds used as scavengers in this invention have a rate of decomposition which is closely related to that of tetraethyllead, they are called uniformly stable scavengers or, briefly, U. S. scavengers. Of course, any hydrogen halide liberated by the scavenger before the flame but which has not reacted with the lead oxide at that time will still be available for reaction after burning in the same manner as is accomplished by the conventional scavengers. It is for this reason that the scavengers of the instant invention are also called double-acting scavengers.

The scavenger composition of my new antiknock fluid mixtures can be described in terms of theories of halogen. A theory of halogen is defined as the amount of halogen which is necessary to react completely with the lead present in the antiknock mixture to convert it to lead dihalide. In other words, there are two atoms of halogen for every atom of lead present.

The outstanding properties and unexpected advantages of my scavengers can be graphically illustrated by the following statement of results: A single cylinder CFR L-head test engine was operated at 900 R. P. M. on a fuel-to-air ratio of 0.082 on an isooctane fuel containing 13.20 grams of lead as tetraethyllead per gallon and 0.75 theory of bromine as 1-bromo-1-phenylethane, one of the scavengers of this invention. The amount of deposit on the exhaust valve was only 17 percent as compared with the amount of deposit formed when the same fuel was run through the same engine for an equal length of time with no scavenger present. Thus, the amount of deposit removal when a scavenger of this invention was employed was 83 percent. When a similar run was made with 0.75 theory of bromine as 1-bromo-2-phenylethane, the amount of deposit on the exhaust valve was 44 percent as compared with the fuel containing lead but no scavenger. The relative effectiveness in deposit removal of my scavenger as compared to a prior art scavenger was therefore 148 percent. The deposit removing effectiveness of 1-bromo-1-phenylethane is in like manner 166 percent as great as that of ethylene dibromide when the latter is employed under similar conditions.

Other compounds of my invention are also found to be much higher in deposit removing effectiveness than conventional scavengers. For example, 2-bromo-2-phenylpropane has a deposit removing effectiveness in excess of 90 percent when compared to the efficiency of ethylene dibromide, which has a deposit removing effectiveness of only 50 percent at equivalent concentrations of bromine. In like manner, 1-chloro-1-phenylethane has a much higher deposit removing effectiveness than the conventional scavenger, ethylene dichloride. Other alkyl-aryl-halomethane scavengers of this invention which exhibit a deposit removing effectiveness as great as 190 percent of that displayed by conventional scavengers are 1 - (p-diphenyl) - 1 - bromoethane, 1 - naphthyl - 1- bromooctane, 2-phenyl-2-bromopropane, 2-phenyl-2-chloropropane, and the like.

In order to determine the effect of my new scavengers on exhaust valve life, a single cylinder test engine having a combustion chamber displacement of 17.6 cu. in. and a compression ratio of 5.6:1 is operated at 2700 R. P. M. on a fuel-to-air ratio of 0.07 using a commercial fuel containing 0.05 percent sulfur and 3 ml. of tetraethyllead together with various halogen compounds as scavengers. When the scavenger is composed of 0.3 theory of bromine as ethylene dibromide, 1.0 theory of chlorine as ethylene dichloride, and 0.2 theory of bromine as 1-bromo-1-phenylethane, the average number of hours of operation of the engine until the exhaust valve fails due to burning is considerably longer than when the conventional scavenger mixtures consisting of 0.5 theory of bromine as ethylene dibromide and 1.0 theory of chlorine as ethylene dichloride are used. Thus, it is seen that replacing part of the bromine contained as ethylene dibromide in the latter scavenger mix with an equivalent amount of bromine in the form of one of the compounds of this invention results in a much longer valve life.

Another completely novel and unexpected advantage of the present scavengers is the fact that when employed at relatively low concentrations, they actually enhance the antiknock effectiveness of tetraethyllead or other organolead antiknock agents. For example, when a single cylinder test engine is run on primary reference fuel of 80 octane number containing 3.02 grams of lead as tetraethyllead per gallon and 0.3 theory of bromine as 1-bromo-1-phenylethane, a new scavenger of this invention, an increase of several percent in the effectiveness of the tetraethyllead is observed. That is, the antiknock action of the fuel blended with the new scavenger is equal to the antiknock action that could be achieved by adding an additional amount of tetraethyllead to the fuel used.

The alkyl-aryl-halomethane compounds employed as scavengers according to this invention fall into two categories, one consisting of compounds having 8 to 20 carbon atoms, which constitute the broad class of compounds of this invention; the other category is the preferred class of this invention and comprises compounds having from 8 to 14 carbon atoms in the molecule. The aromatic portion of the molecule can be mono- or polynuclear and may contain hydrocarbon substituents thereon. Also, there can be more than one aromatic ring in the compound. Various non-limiting examples of the improved double-acting, uniform stability scavengers of this invention are as follows:

Typical alkyl-aryl-halomethane scavengers are 1-phenyl-1-bromoethane, 1-phenyl-1-chloroethane, 1,4-di-(1-bromoethyl)-benzene, 1,3,5-tri-(1-chloroethyl)benzene, 1 - (p - diphenyl) - 1 - bromoethane, phenyl - (3 - methylcyclohexyl)chloromethane, 1-naphthyl-1-bromoethane, 1-(8-methylnaphthyl)-1-chloroethane, and 1-(4,7-dimethyl-2-naphthyl)-1-bromoethane, which illustrate the preferred species having 8 to 14 carbon atoms. Examples of alkyl-aryl-halomethane scavengers having more than 14 carbon atoms which are part of my invention are 1 - (3,5 - dimethylphenyl) - 2 - (cyclohexyl) - 1 - bromoethane, 1-(p-diphenyl)-1-chlorohexane, 1-(8-cyclohexyl-naphthyl)-1-bromoethane, 1-anthryl-1-chlorohexane, 1,3-dibromo-1,3-diphenyl-2,2-dimethylpropane, 1-chloro-4-bromo - 1,4 - diphenyl - 2,3 - dimethylbutane, 1,4 - di[4-(1-bromoethyl)phenyl]-1,4-dichlorobutane, and the like. It will be noted that in each of the compounds named there is at least one carbon atom having a hydrogen attached thereto in a position alpha to the halogen-bearing carbon atom. This is true for all the compounds of this invention.

An especially preferred group of halogen-containing scavengers of this invention are aryl-dialkyl-halomethanes, as, for example, 2-phenyl-2-bromopropane, 2-phenyl - 2 - chloropropane, 1 - phenyl - 1 - cyclohexyl - 1-bromoethane, and 1-(3-methylphenyl)-1-phenyl-1-chloroethane, which illustrate the preferred species having from 8 to 14 carbon atoms. Examples of the especially preferred aryl-dialkyl-halomethane compounds of this invention having 15 to 20 carbon atoms are 2-(3,5-dimethylphenyl) - 2 - bromo - 3 - methylpentane, 2 - (p-propylphenyl) - 2 - chlorocyclohexane, 2 - (4 - ethylnaphthyl) - 4 - methyl - 2 - chloropentane, 1 - (3,5 - dimethylphenyl)-1-cyclohexyl-1-bromoethane, 2-phenanthryl-2-chlorohexane, and the like.

Non-limiting examples of alkyl-aryl-halomethane compounds of this invention which have olefinic substituents therein are 3 - bromo - 3 - phenylpropene - 1, 4 - chloro - 4 - phenylbutene - 1, 1 - phenyl - 2 - (cyclohexene-3)-1-bromoethane, and the like, which constitute the preferred species of scavengers of this invention having from 8 to 14 carbon atoms; and 12-bromo-12-phenyl dodeceen-1, 6-chloro-6-anthryl hexene-1, 7-bromo-7-phenyl octene-1, and the like, which constitute compounds having from 15 to 20 carbon atoms.

The alkyl-aryl-halomethane scavengers of this invention can be prepared by various different methods. One such method is the hydrohalogenation of an aryl-substituted olefin in which the carbon atom alpha to a nuclear carbon atom is attached by a double bond to another non-aromatic carbon atom. An example is the hydrobromination of styrene to give 1-phenyl-1-bromoethane. Other means of synthesis will be apparent to those skilled in the art.

It has been found that the scavengers of this invention can be used in several different formulations or blend types. Principal among these are: (a) blends or fluids in which my scavengers are the sole scavenging agents, (b) fluids in which the scavengers are added to conventional antiknock fluids to supplement the scavengers therein, and (c) those in which the new scavengers replace a portion of the scavenger in a conventional antiknock fluid. The scavengers of this invention can in general be used in admixture with other scavengers in any proportion within the limits of the over-all amounts of scavenger employed in my antiknock fluids as stated below. Furthermore, mixtures of my scavengers can be so used as well as individual scavengers.

In general, my scavengers can be employed together with any other scavenging agent or mixture of two or more of them. For example, the aryl-alkyl-halomethane compounds of this invention can be added to organolead antiknock fluids containing 0.5 theory of bromine as ethylene dibromide and 1.0 theory of chlorine as ethylene dichloride or any combination of theories of these two components, as, for example, those described in U. S. Patent 2,398,281. The aryl-alkyl-halomethane compounds can also be employed with one theory of bromine as ethylene dibromide or amounts of the latter either greater or less than one theory. Other scavenger compositions that can be employed together with the new scavengers of this invention are those having a vapor pressure of substantially 0.2 to 6 mm. of mercury at 50° C., as, for example, the compositions described in U. S. Patents 2,479,901 and 2,479,903. My scavenging agents can likewise be used with compositions of the kind described in U. S. Patents 2,364,921; 2,479,902; 2,490,606; 2,496,983; etc. It is not intended that mixed scavengers in the fluids and fuels of this invention be limited to mixtures of my new scavenger with the above-mentioned conventional scavengers, but they may be employed together with any hydrocarbon fuel-soluble organic halide scavenger compounds consisting of carbon and elements selected from the group consisting of bromine, chlorine, hydrogen, nitrogen, and oxygen. In addition, my scavengers can be employed with deposit modifying compounds not containing halogens; for example, organophosphorus compounds and the like. In any event, a halohydrocarbon scavenger of this invention is always present so that the amount of halogen which it provides represents at least 1 mole percent of total halogen in the scavenger mixture.

In general, good results are obtained when the antiknock mixtures are so composed that the amount of halogen present ranges between 0.1 and 4.0 theories. This includes not only the amount of new scavenger but also the amount of prior art scavenger, if any, so that the above range applies to the total amount of halogen present in the antiknock fluid. For most outstanding results I prefer that the total amount of halogen be between 0.15 and 2.0 theories, as at least 0.15 theory should be present to give best scavenging results, while not much additional scavenging benefit is obtained when more than 2.0 total theories are used.

Referring to the three principal blend types listed above, when I use type (a), in which my scavengers are the sole scavenging agents, I prefer to use between 0.1 and 1.5 theory of halogen. For the greatest benefit I use alkyl-aryl-chloromethane compounds to the extent of 0.3 to 1.5 theory and alkyl-aryl-bromomethane compounds in amount between 0.15 and 0.75 theory. When a mixture of the chloride and bromide is used, the amount of each will vary according to a relationship which will be shown below.

When I employ either fluid type (b), a fluid in which my new scavengers are added to conventional antiknock fluids to supplement the scavengers therein, or fluid type (c), one in which my scavengers replace a portion of the scavenger in a conventional antiknock fluid, I adjust the amounts of scavenger compounds so that the total halogen is from 0.1 to 4.0 theories, preferably 0.15 to 2.0 theories, and the portion of this which is in the form of my novel scavenger ranges between 0.01 and 1.0 theory, preferably 0.01 to 0.65 theory.

A preferred embodiment of my invention is to employ the alkyl-aryl-halomethane compounds along with other scavenger compounds such as other halogen-containing compounds. When made use of in this manner, the alkyl-aryl-halomethane compounds of the kind referred to hereinabove can be employed in low concentrations at which they are found to be most effective. That is, the alkyl-aryl-halomethanes can be employed at concentrations at which they enhance the effect of the lead antiknock agent. When used with conventional and other prior art scavengers in this manner, the preferred concentrations of the alkyl-aryl-halomethanes are in amounts of up to about 0.65 theory of halogen based on the lead present. The total amount of halogen due to the various compounds in the scavenger mixture is governed by the equation which is discussed fully hereinbelow. The advantage of usuing my uniformly stable scavengers with the less reactive prior art scavengers is that the latter can be present in larger concentrations to provide scavenging components during and after the passage of the flame front through the gases in the combustion chamber, while the former can be present in amount sufficient to act on the deposit forming particles soon after they are formed and have exerted their anti-knock effect and prior to the passing of the flame front. Thus, a combination of two or more different types of compounds, of which up to 0.65 theory constitutes the alkyl-aryl-halomethane scavengers of this invention, constitutes a scavenging composition, the deposit minimizing effectiveness of which has not been attained before without bringing in some other deleterious results such as excessive corrosion, etc.

It has been found that the relative scavenging effectiveness of bromine-containing compounds and chlorine-containing compounds varies depending on the engine operating conditions. Thus, under light load operations, as in passenger car service when engine surface temperatures are low, the scavenging efficiency of chlorine-containing compounds is much lower than that of similar bromine-containing compounds. On the other hand, when the engine temperature is relatively high, as is the case in heavy-duty truck operation, the scavenging effectiveness of chlorine in the form of a chlorine-containing compound is considerably higher than under low temperature conditions, while the bromine-containing compounds show a trend in the opposite direction. Taking an over-all average over varying engine operating conditions, it may be said that chlorine in the form of a chlorine-containing compound is approximately one-half as effective in removing deposits from exhaust valves and spark plugs as an equivalent number of theories of bromine in the form of a similar bromine-containing compound.

Accordingly, a convenient method for expressing the total number of theories of halogen in a lead-containing antiknock fluid or fuel is in terms of the scavenging effectiveness of bromine. For example, since a chlorine-containing compound is, on the average, only about one-half as effective a scavenger as a similar bromine-containing compound, it will require about twice as many equivalents of the chloro compound to obtain the same deposit removing effect as of a given amount of a bromine compound. In this regard it should be pointed out that I use the upper limit of 4.0 theories of scavenger when employing only chlorine-containing scavengers (since the same amount of effectiveness is obtained with 2.0 theories of bromine); and by the same token I use the lower limit of 0.1 theory of scavenger when a bromine-containing scavenger is the sole scavenging constituent (since an equivalent amount of chlorine is 0.2 theory). Thus, if X is the number of theories in terms of bromine effectiveness required in a scavenging composition, it is convenient to determine the make-up of a desired fluid with respect to the proportions of chlorine scavenger and bromine scavenger by use of the equation $$\tfrac{1}{2}T_{Cl} + T_{Br} = X$$

In this equation $T_{Cl}$ represents the number of theories of chlorine, and $T_{Br}$ represents the number of theories of bromine. The limits set for X correspond to the total bromine scavenging effectiveness desired. Therefore, X can range between 0.1 and 2.0. To determine the composition of a fluid by means of this equation, therefore, I first select the total number of theories of halogen in terms of bromine scavenging effectiveness desired and substitute this number for X in the equation. Then I select the number of theories of either chlorine or bromine which I wish to use. The equation is next solved for the remaining unknown. By this method the composition of the fluid is determined insofar as the scavenger is concerned.

To illustrate the use of this equation, suppose that it is desired to make up a fluid whose effectiveness in terms of bromine scavenger is equal to 1.5 theories, and suppose further that it is desired to use 1.2 theories of chlorine scavenger in this fluid. Placing these numbers in the above equation, there is obtained the expression $$\tfrac{1}{2}(1.2) + T_{Br} = 1.5$$

Solving this equation of $T_{Br}$, it is found that 0.9 theory of bromine scavenger should be used.

The valves of X in the above equation can vary from 0.1 to 2.0. Therefore, the equation holds true for values of $T_{Cl}$ ranging from zero to 4.0, while the value of $T_{Br}$ changes from 2.0 to zero. When the new scavengers of this invention are the sole scavenging agents, the preferred range of values for X is 0.15 to 0.75, and the equation will then embody the range of values for the theories of halogen between the upper and lower limits that can be used as stated hereinabove.

The use of the novel scavengers of this invention either alone or in combination with other scavengers possesses a number of advantages in addition to those mentioned above. One advantage is that by using the scavengers of the instant invention the scavenging effect equivalent to that of conventional scavengers can be obtained with a much lower concentration of halogen based on the lead present. For example, the scavenger mixture consisting of 1 theory of chlorine as ethylene dichloride plus 0.4 theory of bromine as 1-phenyl-1-bromopentane has essentially the same effect as a conventional scavenger mix which is made up of 1.0 theory of chlorine as ethylene dichloride and 0.5 theory of bromine as ethylene dibromide. This in turn reduces the corrosion effects due to hydrohalic acids on various engine parts, such as cylinder walls, intake and exhaust valves, mufflers, etc. On the other hand, when a combination of conventional scavengers and the scavengers of the instant invention are employed in an amount such that the concentration of halogen is equivalent to that commercially in use at present, a greatly increased scavenging effect is obtained. An illustration of this is the substitution of a small amount of alkyl-aryl-halomethane compounds for the halogen compound of a conventional scavenger mix to give, for example, an antiknock fluid which contains as scavengers 1.0 theory of chlorine as ethylene dichloride, 0.4 theory of bromine as ethylene dibromide, and 0.1 theory of bromine as 2-phenyl-2-bromopropane. This antiknock fluid, when employed in gasoline in a spark ignition engine, shows a marked improvement in scavenging effect over an equivalent amount of chlorine and bromine in the form of ethylene dihalides. It can readily be seen that by taking advantage of these various benefits a great deal of flexibility can be achieved in tailor-making fluids to meet any requirement.

In blending the antiknock fluids with fuels I regulate the amount of antiknock fluid so that the amount of lead present in the fuel varies between 0.02 and 13.2 grams per gallon. It is to be understood that I may obtain the finished fuels by blending the various ingredients of my antiknock fluids separately or in any sub-combination with the fuels, as well as blending the finished antiknock fluids with the fuels.

The following examples illustrate various antiknock fluids of this invention.

*Example I*

Ninety-eight parts (1.0 theory) of ethylene dichloride, 94 parts (0.5 theory) of ethylene dibromide, and 11.1 parts (0.03 theory) of 1-phenyl-1-bromoethane are admixed with efficient stirring with 323 parts of tetraethyllead. This gives an antiknock fluid in which the conventional fluid commonly known as 62-Mix has been supplemented by one of the new scavengers.

To obtain a finished fuel, the above described fluid is blended with gasoline so that the amount of lead present is 0.5 gram per gallon. Use of this fuel in a single cylinder test engine results in a smaller amount of deposits in the combustion chamber than when equivalent amounts of bromine and chlorine are employed in the form of the ethylene dihalides.

*Example II*

To 323 parts of tetraethyllead is added with good stirring 98 parts (1.0 theory) of ethylene dichloride, 75 parts (0.4 theory) of ethylene dibromide, and 21.3 parts (0.05 theory) of 2-phenyl-2-bromobutane.

To obtain a finished fuel, the above fluid is blended with gasoline so that it is evenly distributed throughout the gasoline and so that the amount of lead present in the gasoline is 7.5 grams per gallon. When this fuel is used in the operation of a single cylinder aviation-type engine, it is found that smaller amounts of deposits remain in the combustion chamber than when an equivalent amount of the respective halogens are present as the dihalides.

*Example III*

To 379 parts of tetrapropyllead is added 37 parts (0.1 theory) of 1-phenyl-1-bromoethane.

This is blended with gasoline in relative amounts so that the finished fuel contains 3.16 grams of lead per gallon. When this fuel is employed in the operation of a spark-fired internal combustion engine, it is found that the deposit scavenging effect of the 1-phenyl-1-bromobutane is much higher than of an equivalent amount of bromine in the form of a conventional primary halide.

Valuable antiknock fluids are also obtained when the above example is repeated with the amounts varying so that the amount of bromine as scavenger is as high as 2.0 theories. For best results it is preferred to blend so that when an alkylarylchloromethane is used, the amount ranges between 0.3 and 1.5 theories, and so that when an alkylarylbromomethane is used, the amount of scavenger varies between 0.15 and 0.75 theory. Examples of fluid compositions of this type are: A mixture of 323 parts of tetraethyllead and 63.9 parts (0.15 theory) of 1-phenyl-1-bromobutane; a fluid containing 323 parts of tetraethyllead to 391 parts (0.75 theory) of 1-(p-diphenyl)-1-bromoethane; a composition which contains 323 parts of tetraethyllead and 100 parts (0.3 theory) of 1,4-dichloro-1,4-diphenyl-2,2,3,3-tetramethylbutane; and a mixture of 323 parts of tetraethyllead and 720 parts (1.5 theories) of 1-($\beta$-anthryl)-1-chloroethane. Each of these fluid compositions is blended with hydrocarbon fuels as indicated above to make up a finished fuel.

*Example IV*

To 254 parts of toluene as a solvent containing a blue dye are added 5 parts of 2,6-ditertiarybutyl-4-methylphenol, 323 parts of tetraethyllead, 92 parts (0.25 theory) of 1-bromo-1-phenylethane, and 139 parts (0.5 theory) of 1-chloro-1-phenylethane. This provides an antiknock fluid wherein the new scavengers comprise the only scavengers present and wherein the total amount of halogen is 0.75 theory.

This fluid is admixed with gasoline so that the total amount of lead present, which is uniformly distributed throughout the fuel, is 4.22 grams per gallon. When operating road vehicles, it is found that the use of this fuel results in longer valve and spark plug life as well as a lower amount of deposit in the combustion chamber than when an equivalent amount of halogens is employed in the form of conventional scavengers.

I also make blends which consist of tetraethyllead plus two bromo compounds, tetraethyllead plus two chloro compounds, and tetraethyllead plus a chlorine compound and a bromine compound different from those above, as, for example, tetraethyllead with 0.3 theory of bromine as 1-($\alpha$-naphthyl)-1-bromoethane and 0.35 theory of bromine as 5-bromo-5-phenylpentene-1; and tetraethyllead with 0.9 theory of chlorine as 1-phenyl-1-(3-methylcyclohexyl)-chloromethane and 0.55 theory of chlorine as 1-($\alpha$-chloroethyl)-8-methylanthracene.

*Example V*

To 323 parts of tetraethyllead is added 188 parts (1 theory) of ethylene dibromide and 39.6 parts (0.1 theory) of 2-bromo-2-phenylpropane. This composition provides an antiknock fluid wherein the scavengers comprise in part a compound of this invention and the scavenger used in 1–T mix. The total amount of scavenger is equivalent to 1.1 theories of bromine based on the amount of lead present.

The above fluid is added to gasoline with appropriate agitation so that when uniformly distributed throughout the fuel, the concentration of the fluid is equivalent to 2.0 grams of lead per gallon of fuel. The deposit scavenging effect of this scavenger mixture, when the fuel is employed in a commercial multi-cylinder engine, is considerably greater than when an equivalent amount of bromine is made use of in the form of ethylene dibromide.

In like manner, fluids and fuels are prepared containing tetraethyllead together with the scavengers mentioned above in this example. A variation of the scavenger mix used herein is to combine 1 to 0.1 theory of bromine as ethylene dibromide with from 0.01 to 1.0 theory of halogen as an alkyl-aryl-halomethane, as, for example: a fluid containing 323 parts of tetraethyllead, 188 parts (1.0 theory) of ethylene dibromide, 3.7 parts (0.01 theory) of 1-bromo-1-phenylethane; gasoline containing 212 parts (0.5 theory) of 1-bromo-1-phenylbutane and 188 parts (0.1 theory) of ethylene dibromide for every 323 parts of tetraethyllead.

*Example VI*

To 351 parts of diethyl diisopropyllead is added 113 parts (0.6 theory) of ethylene dibromide and 176 parts (0.3 theory) of 1-bromo-1-(3,5-dimethylphenyl)-2-cyclohexylethane, providing an antiknock fluid containing 0.9 theory of halogen based on the lead present.

This fluid is blended with fuel of the gasoline boiling range in amounts such that the concentration of lead is 2.6 grams of lead per gallon. The scavenging effectiveness of the halogen compounds in this fuel is found to be about the same as that of one theory of ethylene dibromide, while the corrosion effects have been considerably reduced.

Other fluid and fuel compositions are made up in which the amount of bromine as ethylene dibromide varies from 0.2 to 0.95 theory and the amount of halogen as the more effective scavengers of this invention varies from 0.01 to 1.0 theory. Examples of such other scavengers that can be mixed with ethylene dibromide are illustrated by compositions such as 0.2 theory of bromine as ethylene dibromide together with 0.65 theory of bromine as 2-bromo-2-($\alpha$-naphthyl)-hexane, 0.6 theory of bromine as ethylene dibromide and 1.0 theory of chlorine as 3-chloro-3-phenyloctane, and the like.

*Example VII*

To 419 parts of diphenyldiethyllead is added 128 parts (0.3 theory) of 2-bromo-2-phenylbutane and 765 parts (3.7 theory) of 1,2,3-tribromopentane. This constitutes an antiknock fluid wherein the scavenger consists of two components, one of which is the new scavenger of this invention and the other is a member of the class known as uniformly volatile or U. V. scavengers.

The antiknock fluid is blended with fuel of the gasoline boiling range in amount such that the concentration of lead is 0.02 gram per gallon. The scavenger mixture employed herein has the advantage of a combination of a halogen compound which has a volatility closely related to that of the lead compound so as to be distributed in the various cylinders of a multi-cylinder engine in about the same relative proportions as the lead antiknock agent, and also a scavenger which has a rate of decomposition of the same order of magnitude as that of the lead compound. This results in a smaller amount of deposits on parts of the combustion chamber, as well as longer spark plug and valve life.

Other combinations can be employed using the very effective compounds of this invention and the uniformly volatile compounds of the type described in U. S. 2,479,900; 2,479,901; and 2,479,903.

*Example VIII*

To 323 parts of tetraethyllead is added 94 parts (0.5 theory) of ethylene dibromide, 99 parts (1.0 theory) of ethylene dichloride, and 18.5 parts (0.05 theory) of 1-bromo-1-phenylethane. The antiknock fluid thus prepared is then blended with a fuel of the gasoline boiling range in amount such that the concentration of lead is 3.18 grams of lead per gallon. The deposit scavenging effect of the halogen compounds, when this fuel is employed in a multi-cylinder engine, is found to be greater than of a fuel in which an equivalent amount of bromine is present as ethylene dibromide.

Other compositions are also prepared in which the amount of scavenger in the fluid and/or fuel, based on the amount of lead present, is illustrated by compositions such as 0.5 theory of bromine as ethylene dibromide, 1.0 theory of chlorine as ethylene dichloride, and 0.5 theory of chlorine in the form of 2-chloro-2-phenylbutane; 0.5 theory of bromine as ethylene dibromide, 1.0 theory of chlorine as ethylene dichloride together with 0.03 theory of bromine as 1-bromo-1-naphthyldecane and 0.04 theory of chlorine as 1-chloro-1-anthrylhexane.

*Example IX*

To 323 parts of tetraethyllead is added 47 parts (0.25 theory) of ethylene dibromide, 99 parts (1.0 theory) of ethylene dichloride, and 85 parts (0.20 theory) of 1-bromo-1-phenylbutane. The fluid thus prepared is blended with hydrocarbons of the gasoline fuel boiling range in amount such as to give a concentration of 2.8 grams of lead per gallon. This fuel displays a very efficient scavenging effectiveness.

In like manner, antiknock fluid and fuel compositions are prepared in which the scavenger compositions are 0.45 theory of bromine as ethylene dibromide, 1.0 theory of chlorine as ethylene dichloride, and 0.075 theory of bromine as 1-bromo-1-phenyldodecane; and 0.9 theory of bromine as ethylene dibromide, 0.6 theory of chlorine as ethylene dichloride, and 0.05 theory of bromine in the form of 1-bromo-1-phenyltetradecane.

*Example X*

To 323 parts of tetraethyllead is added 92.5 parts (0.25 theory) of 1-bromo-1-phenylbutane and 62.5 parts (0.25 theory) of 2-bromoethanol-1. This mixture is thoroughly agitated to insure even distribution of the scavenger in the tetraethyllead fluid. The fluid is then blended with a hydrocarbon fuel of the gasoline boiling range in amount such as to give a concentration of 4.0 grams of lead per gallon of fuel.

Fluid and fuel compositions are also made up in which the scavenger content is composed of compositions such as 0.1 theory of bromine as 2,5-dibromo-2,5-dimethylhexane, 0.15 theory of bromine as tertiary butylbromide, 0.1 theory of chlorine as 3,5-dichloroheptane, 0.5 theory of bromine as diethyldibromomalonate, and 0.15 theory of bromine as 1-bromo-1-phenylethane. Mixtures of any combination of two or more of these scavengers can also be used with better results in scavenging effectiveness being achieved than when the compounds of this invention are not included.

In addition to the benefits given above, upon employing the deposit scavenging compounds of this invention, it is also found that the use of many of these scavengers minimizes the octane requirement increase of engines operated on commercial fuels. This increase in octane requirement is a phenomenon observed as the time of operation of an engine is lengthened. It is due to deposits which are built up in various parts of the combustion chamber, with the result that a fuel of a quality higher by several octane numbers is required to provide a performance equivalent to that of a clean engine or combustion zone. The α-aryl halohydrocarbon scavengers of this invention tend to minimize this octane requirement increase.

The scavengers of this invention may be used with organolead or hydrocarbonlead compounds in general. Examples of such compounds, including tetraalkyllead and alkylaryllead compounds other than tetraethyllead, are tetrapropyllead, dimethyldiethyllead, methyltriethyllead, diethyldiphenyllead, tetrabutyllead, and the like, as well as mixtures of these compounds. The amount of lead compounds employed will vary from about 0.02 to 13.2 grams of lead per gallon, depending on the engine it is to be used in and the kind of fuel employed.

The antiknock composition of this invention may contain other components besides lead antiknock compounds and the α-aryl haloalkyl compounds as scavengers. Such other components may be solvents, such as toluene or kerosene, or other hydrocarbons. They may also contain dyes which are often used for purposes of identification of fluids. Likewise, antioxidants such as alkylated phenols and amines, metal deactivators, phosphorus compounds, other antiknock agents such as amines and metal carbonyls, anti-rust and anti-icing agents, and wear inhibitors, may also be added to the antiknock composition or fuel containing the same. In like manner, the fuels to which the antiknock compositions of this invention are added may have a wide variation of composition. These fuels generally are petroleum hydrocarbons and are usually blends of two or more components. These fuels can contain all types of hydrocarbons, including paraffins, both straight and branched-chain, olefins, cycloaliphatics containing paraffin or olefin side chains, and aromatics containing aliphatic side chains. The fuel type depends on the base stock from which it is obtained and on the method of refining. For example, it can be a straight run or processed hydrocarbon, including thermally cracked, catalytically cracked, reformed fractions, etc. The boiling range of the components of gasoline can vary from 0 to about 430° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range of from about 82° F. to about 338° F., with certain fractions of the fuel boiling away at particular intermediate temperatures.

The hydrocarbon fuels in which the antiknock composition of this invention can be employed often contain minor quantities of various impurities. One such impurity is sulfur, which can be present either in a combined form as an organic or inorganic compound or as the elemental sulfur. The amounts of such sulfur can vary in various fuels from about 0.003 percent to about 0.30 percent by weight. Fuels containing quantities of sulfur, both lesser and greater than the range of amounts referred to above, are also known. These fuels also often contain added chemicals in the nature of antioxidants, rust inhibitors, dyes, and the like.

Having fully described the nature of the improved antiknock fluids and fuels obtained according to this invention, it is not intended that this invention be limited except within the scope of the appended claims.

I claim:

1. An organolead antiknock fluid consisting essentially of an organolead antiknock agent and halohydrocarbon wherein at least one mole percent of halogen in the scavenger is present in the form of alkyl-aryl-halomethane compounds having 8 to 14 carbon atoms and 1 to 4 halogens, in which the halogen has an atomic weight of 35–81 and is bonded to a non-aromatic carbon atom which is alpha to a doubly-bonded nuclear carbon and is also alpha to a hydrogen-bearing carbon atom; the total amount of said halohydrocarbon scavenger being in the range of 0.1–4.0 theories based on the amount of organolead compound present and the total amount of said alkyl-aryl-halomethane compound being in the range of 0.01–1.5 theories based on the amount of organolead compound present; a theory being that amount of scavenger which provides two atoms of halogen for every lead atom present in said fluid.

2. The composition of claim 1 wherein said halohydrocarbon having 8 to 14 carbon atoms is an alkylarylbromomethane compound wherein the bromine is on the carbon atom alpha to the aromatic ring.

3. The composition of claim 1 wherein said halohydrocarbon having 8 to 20 carbon atoms is α-bromoethylbenzene.

4. The petroleum hydrocarbon fuel of the gasoline boiling range containing the composition of claim 1 in amount such that the lead content is between 0.02 and 13.2 grams of lead per gallon of fuel.

5. A petroleum hydrocarbon fuel of the gasoline boiling range containing the composition of claim 1 in amount such that the lead content is between about 0.02 and 13.2 grams of lead per gallon of fuel and wherein the halohydrocarbon having 8 to 14 carbon atoms is a α-bromoalkylbenzene.

6. An organolead antiknock fluid consisting essentially of an organolead antiknock agent and halohydrocarbon scavenger wherein the scavenger components consist essentially of 0.03 theory of bromine as α-bromoethylbenzene, 0.3 theory of bromine as ethylene dibromide, and 1.0 theory of chlorine as ethylene dichloride; a theory being that amount of scavenger which provides 2 atoms of halogen for every lead atom present in said fluid.

7. A petroleum hydrocarbon fuel of the gasoline boiling range containing the antiknock fluid composition of claim 6.

References Cited in the file of this patent

UNITED STATES PATENTS

| | | |
|---|---|---|
| 2,281,598 | Prutton | May 5, 1942 |
| 2,479,900 | Calingaert et al. | Aug. 23, 1949 |

FOREIGN PATENTS

| | | |
|---|---|---|
| 988,206 | France | Aug. 24, 1951 |